(12) United States Patent
Sadeh-Koniecpol et al.

(10) Patent No.: US 9,547,998 B2
(45) Date of Patent: Jan. 17, 2017

(54) CONTEXT-AWARE TRAINING SYSTEMS, APPARATUSES, AND METHODS

(75) Inventors: Norman Sadeh-Koniecpol, Pittsburgh, PA (US); Kurt Wescoe, Pittsburgh, PA (US); Jason Brubaker, Mechanicsburg, PA (US); Jason Hong, Pittsburgh, PA (US)

(73) Assignee: WOMBAT SECURITY TECHNOLOGIES, INC., Pittsburgh, PA (US)

( * ) Notice: Subject to any disclaimer, the term of this patent is extended or adjusted under 35 U.S.C. 154(b) by 842 days.

(21) Appl. No.: 13/442,587

(22) Filed: Apr. 9, 2012

(65) Prior Publication Data
US 2012/0258437 A1    Oct. 11, 2012

Related U.S. Application Data

(60) Provisional application No. 61/473,366, filed on Apr. 8, 2011, provisional application No. 61/473,384, filed on Apr. 8, 2011.

(51) Int. Cl.
*G06F 21/50* (2013.01)
*G06F 21/55* (2013.01)
(Continued)

(52) U.S. Cl.
CPC ............ *G09B 19/00* (2013.01); *G06F 21/55* (2013.01); *G06F 21/552* (2013.01); *G06F 21/554* (2013.01); *G06F 21/56* (2013.01); *G06F 21/562* (2013.01); *G06F 21/563* (2013.01); *G06F 21/564* (2013.01); *G06F 21/565* (2013.01); *G06F 21/566* (2013.01); *G06F 21/567* (2013.01); *G09B 5/00* (2013.01); *H04L 63/14* (2013.01);
(Continued)

(58) Field of Classification Search
CPC .............. H04L 63/145; H04L 63/1408; H04L 63/1416; H04L 63/1425; H04L 63/1433; H04L 63/1441; H04L 63/1458; H04L 63/1466; H04L 63/1475; H04L 63/1483; H04L 63/1491
USPC ................................................. 726/11, 22–26
See application file for complete search history.

(56) References Cited

U.S. PATENT DOCUMENTS 6,324,647 B1    11/2001   Bowman-Amuah
6,634,887 B1    10/2003   Heffernan, III et al.
(Continued)

OTHER PUBLICATIONS

Kumaraguru et al., "Protecting People from Phishing: The Design and Evaluation of an Embedded Training Email System", 2007, In Proceedings of the SIGCHI Conference on Human Factors in Computing Systems.
(Continued)

*Primary Examiner* — Nikolai A Gishnock
(74) *Attorney, Agent, or Firm* — Fox Rothschild LLP

(57) ABSTRACT

Context-aware training systems, apparatuses and systems. The context-aware training systems, apparatuses and systems are computer-implemented and include sensing a user action and, based on a training needs model, estimating a cost or benefit to exposing the user to a training action, selecting a training action from a collection of available training actions and delivering the training action to the user if the user action indicates a need for the user to be trained and the cost or benefit to exposing the user to the training action indicates user exposure to the training action is warranted.

70 Claims, 9 Drawing Sheets

(51) Int. Cl.
*G06F 21/56* (2013.01)
*H04L 29/06* (2006.01)
*G09B 19/00* (2006.01)
*G09B 5/00* (2006.01)

(52) U.S. Cl.
CPC ........ *H04L 63/145* (2013.01); *H04L 63/1408* (2013.01); *H04L 63/1416* (2013.01); *H04L 63/1425* (2013.01); *H04L 63/1433* (2013.01); *H04L 63/1441* (2013.01); *H04L 63/1458* (2013.01); *H04L 63/1466* (2013.01); *H04L 63/1475* (2013.01); *H04L 63/1483* (2013.01); *H04L 63/1491* (2013.01)

(56) References Cited

U.S. PATENT DOCUMENTS

| | | | |
|---|---|---|---|
| 6,954,858 B1 | 10/2005 | Welborn et al. | |
| 7,092,861 B1* | 8/2006 | Shteyn | H04L 12/2805 703/6 |
| 7,325,252 B2 | 1/2008 | Bunker, V et al. | |
| 7,457,823 B2* | 11/2008 | Shraim et al. | 726/26 |
| 7,486,666 B2* | 2/2009 | Meyer | H04L 63/101 370/352 |
| 7,761,618 B2* | 7/2010 | Avraham | G06F 21/55 710/36 |
| 8,046,374 B1 | 10/2011 | Bromwich | |
| 8,063,765 B2* | 11/2011 | Johnson | G06F 21/554 307/116 |
| 8,146,164 B2* | 3/2012 | Eshun | G06F 21/606 726/26 |
| 8,205,255 B2 | 6/2012 | Benea et al. | |
| 8,220,047 B1 | 7/2012 | Soghoian et al. | |
| 8,255,393 B1* | 8/2012 | Yu | H04L 63/1441 707/724 |
| 8,266,320 B1 | 9/2012 | Bell et al. | |
| 8,321,945 B2* | 11/2012 | Nakagawa | G06F 21/552 726/1 |
| 8,341,691 B2* | 12/2012 | Bezilla | G06F 21/552 726/1 |
| 8,402,528 B1* | 3/2013 | McCorkendale | G06F 8/65 726/11 |
| 8,423,483 B2* | 4/2013 | Sadeh-Koniecpol et al. | 706/12 |
| 8,457,594 B2* | 6/2013 | Stevens | H04L 63/083 370/338 |
| 8,464,346 B2 | 6/2013 | Barai et al. | |
| 8,468,244 B2* | 6/2013 | Redlich et al. | 726/26 |
| 8,468,279 B2* | 6/2013 | Khosravi | G06F 21/51 710/48 |
| 8,478,860 B2* | 7/2013 | Roberts | G06F 21/552 702/186 |
| 8,495,700 B2* | 7/2013 | Shahbazi | H04L 63/20 380/247 |
| 8,532,970 B2 | 9/2013 | White et al. | |
| 8,533,847 B2* | 9/2013 | Kedem | G06F 21/78 709/201 |
| 8,560,864 B2* | 10/2013 | Chang | G06F 21/567 713/193 |
| 8,561,134 B2* | 10/2013 | Bezilla | G06F 21/552 726/1 |
| 8,608,487 B2 | 12/2013 | Huie et al. | |
| 8,615,807 B1 | 12/2013 | Higbee et al. | |
| 8,635,703 B1 | 1/2014 | Belani et al. | |
| 8,646,028 B2* | 2/2014 | McKenzie | G06F 21/83 718/1 |
| 8,656,095 B2 | 2/2014 | Coulter | G06Q 10/00 711/112 |
| 8,683,588 B2* | 3/2014 | Esteban | H04L 63/1416 726/22 |
| 8,707,180 B2* | 4/2014 | Butler | G06F 21/552 709/204 |
| 8,719,925 B1* | 5/2014 | Berg | G06F 21/566 726/22 |
| 8,719,940 B1 | 5/2014 | Higbee et al. | |
| 8,751,629 B2 | 6/2014 | White et al. | |
| 8,763,126 B2* | 6/2014 | Wang | G06F 21/00 713/1 |
| 8,769,684 B2 | 7/2014 | Stolfo et al. | |
| 8,776,170 B2* | 7/2014 | Bezilla | G06F 21/552 726/1 |
| 8,782,745 B2* | 7/2014 | Stevens | H04L 63/1416 726/4 |
| 8,793,795 B1* | 7/2014 | Ravid | G06F 21/567 726/24 |
| 8,793,799 B2 | 7/2014 | Fritzson et al. | |
| 8,819,825 B2 | 8/2014 | Keromytis et al. | |
| 8,819,858 B2* | 8/2014 | Mandava | G06F 21/554 710/15 |
| 8,914,846 B2* | 12/2014 | Bezilla | G06F 21/552 726/1 |
| 8,918,872 B2* | 12/2014 | Kumar | H04L 63/145 705/325 |
| 8,931,101 B2* | 1/2015 | Baluda | G06F 21/552 726/1 |
| 8,943,554 B2* | 1/2015 | Tran | H04L 63/1416 726/1 |
| 8,966,637 B2 | 2/2015 | Belani et al. | |
| 8,978,151 B1* | 3/2015 | Chamberlain | G06F 21/554 726/26 |
| 9,009,835 B2* | 4/2015 | Yoo | G06F 21/567 709/217 |
| 9,015,789 B2* | 4/2015 | Thomas | G06F 21/554 726/1 |
| 9,031,536 B2* | 5/2015 | Fitzgerald | G06F 21/316 455/411 |
| 9,069,961 B2* | 6/2015 | Khosravi | G06F 21/51 |
| 9,076,132 B2 | 7/2015 | Golan et al. | |
| 9,118,665 B2* | 8/2015 | Krahn | G06F 21/42 |
| 9,141,792 B2* | 9/2015 | Baluda | G06F 21/552 |
| 9,154,523 B2* | 10/2015 | Bezilla | G06F 21/552 |
| 9,215,250 B2* | 12/2015 | Porten | H04L 63/20 |
| 9,280,911 B2* | 3/2016 | Sadeh-Koniecpol | G09B 5/00 |
| 9,330,257 B2* | 5/2016 | Valencia | G06F 21/552 |
| 9,367,484 B2* | 6/2016 | Hogan | G06F 13/38 |
| 9,373,267 B2* | 6/2016 | Sadeh-Koniecpol | G09B 5/00 |
| 9,392,024 B2* | 7/2016 | Bezilla | G06F 21/552 |
| 9,426,179 B2* | 8/2016 | Keene | G06F 21/6218 |
| 2002/0091940 A1 | 7/2002 | Welborn et al. | |
| 2005/0183143 A1 | 8/2005 | Anderholm et al. | |
| 2006/0037076 A1* | 2/2006 | Roy | 726/22 |
| 2006/0075024 A1* | 4/2006 | Zircher et al. | 709/205 |
| 2006/0253906 A1 | 11/2006 | Rubin et al. | |
| 2007/0112714 A1* | 5/2007 | Fairweather | 706/46 |
| 2007/0180525 A1* | 8/2007 | Bagnall | 726/23 |
| 2007/0226796 A1 | 9/2007 | Gilbert et al. | |
| 2007/0245422 A1 | 10/2007 | Hwang et al. | |
| 2007/0271613 A1 | 11/2007 | Joyce | |
| 2008/0052359 A1 | 2/2008 | Golan et al. | |
| 2008/0167920 A1 | 7/2008 | Schmidt et al. | |
| 2008/0222734 A1 | 9/2008 | Redlich et al. | |
| 2008/0254419 A1* | 10/2008 | Cohen | 434/219 |
| 2008/0288330 A1* | 11/2008 | Hildebrand et al. | 705/10 |
| 2009/0144308 A1 | 6/2009 | Huie et al. | |
| 2009/0158430 A1 | 6/2009 | Borders | |
| 2009/0319906 A1 | 12/2009 | White et al. | |
| 2009/0320137 A1* | 12/2009 | White et al. | 726/25 |
| 2010/0010968 A1* | 1/2010 | Redlich et al. | 707/3 |
| 2010/0146615 A1 | 6/2010 | Locasto et al. | |
| 2010/0235918 A1* | 9/2010 | Mizrahi et al. | 726/25 |
| 2011/0167011 A1 | 7/2011 | Paltenghe et al. | |
| 2011/0238855 A1* | 9/2011 | Korsunsky et al. | 709/231 |
| 2012/0124671 A1 | 5/2012 | Fritzson et al. | |
| 2013/0232576 A1 | 9/2013 | Karnikis et al. | |
| 2014/0115706 A1 | 4/2014 | Silva et al. | |
| 2014/0157405 A1 | 6/2014 | Joll et al. | |
| 2014/0165207 A1 | 6/2014 | Engel et al. | |

(56) References Cited

U.S. PATENT DOCUMENTS

2014/0201836 A1 7/2014 Amsler
2014/0230060 A1 8/2014 Higbee et al.
2014/0230061 A1 8/2014 Higbee et al.

OTHER PUBLICATIONS

Kumaraguru et al., "Testing PhishGuru in the Real World", In Proceedings of the 2008 Symposium on Usable Privacy and Security (SOUPS 2008).
Kumaraguru, et al., "Lessons From a Real World Evaluation of Anti-Phishing Training", 2008 Anti-Phishing Working Group e-Crime Researchers Summit.
Sheng, et al., "Anti-Phishing Phil: The Design and Evaluation of a Game That Teaches People Not to Fall for Phish", Symposium on Usable Privacy and Security (SOUPS) 2007, Jul. 18-20, 2007, Pittsburgh, PA, USA.
Mitrovic, et al., "Evaluation of a Constraint-Based Tutor for a Database Language", International Journal of Artificial Intelligence in Education (1999), 10, 238-256.
Anderson et al., "A Development System for Model-Tracing Tutors", Nov. 18, 2008, Department of Psychology, Paper 78, Carnegie Mellon University Research Showcase.
Fette et al., "Learning to Detect Phishing Emails", World Wide Web Conference Committee, May 8-12, 2007, Banff, Alberta, Canada.
Ferguson, "Fostering E-Mail Security Awareness: The West Point Caronnade," published in Educause Quarterly Nov. 1, 2005.
Jagaric et al., "Social Phishing" ACM (Dec. 12, 2005).
Vishwanath et al., "Why Do People Get Phished? Testing Individual Differences in Phishing Vulnerability with an Integrated, Information Processing Model." Mar. 3, 2011.

\* cited by examiner

| Short Sensor Description | Possible Implementation |
|---|---|
| Dangerous program sensor | Based on signatures of programs known to be dangerous |
| Attachment sensor | Looking at saved attachment directory |
| Configuration sensor | Detects specific OS, browser and email client on a given machine to possibly tailor relevant training |
| WiFi roaming sensor | Keeps track of WiFi access points user attaches to & determines whether they are off/on corporate network |
| Locator | Analyzes IP address or collect WiFi or even GPS locations (depending on client) |
| Phishing website sensor | Determines if user frequently visits sites that have been blacklisted/recently taken down |
| Password change sensor | Detects when users are due to change their passwords (e.g. based on corporate policy or based on some heuristic) |
| USB device sensor | Raises an event when a USB drive is connected |
| Social networking sensor | Senses amount of time spent on social networking sites |
| Social data sensor | Scans social networks to see how much information an employee has posted |

FIG. 5

Sample Training Needs Model with Threshold Levels

| 2020<br>Threat Scenarios | 2030<br>Sensed User Action | 3010<br>Threshold Level | 3020<br>Training Needs |
|---|---|---|---|
| Open a Malicious Attachment | Request Blacklisted Website | More than once per month | Malware (High), Email Security (Medium), Safe Browsing (High) |
| Open a Malicious Attachment | Open Email Attachment | More than 5 times per day | Email Security (High), Malware (High), Safe Browsing (Medium) |
| Fall for Phishing Email | Open Email Attachment | More than 5 times per day | Email Security (High), Malware (High) |
| Fall for Phishing Email | Request Blacklisted Website | More than once per quarter | Email Security (High), Malware (High), Safe Browsing (High) |
| Fall for Phishing Email | Read Email from Smart Phone | Yes | Email Security (High), Smart Phone Security (High) |

FIG. 7

4000 Sample Elements of Quantitative Training Needs Model Based on Risk Estimates

| 2020 Threat Scenario | 4010 Cost Per Incident |
|---|---|
| Open a Malicious Attachment | $1,000 |
| Infect Computer with a Virus | $500 |
| Disclose Personal Information | $10,000 |
| Fall for Phishing Email | $4,500 |

| Threat Scenarios | Sensed User Action | Frequency Thresholds | 24 Hour Susceptibility (Untrained) | 1 Week Susceptibility (Untrained) | 24 Hour Risk (Untrained) | 1 Week Risk (Untrained) |
|---|---|---|---|---|---|---|
| Open a Malicious Attachment | *Request Blacklisted Website* | Less than once per month | 0.001 | 0.005 | $1.0 | $5.0 |
| | | More than once per month | 0.005 | 0.025 | $5.0 | $25.0 |
| | *Open Email Attachment* | Less than 3 times per day | 0.001 | 0.005 | $1.0 | $5.0 |
| | | More than 3 times per day | 0.004 | 0.02 | $4.0 | $20.0 |
| Disclose Personal Information | *Post on Social Networking Sites* | Less than twice per week | 0.00005 | 0.00035 | $0.5 | $3.5 |
| | | More than twice per week & less than 8 times per day | 0.0005 | 0.0035 | $5.0 | $35.0 |
| | | More than 8 times per day | 0.002 | 0.014 | $20.0 | $140.0 |
| Fall for Phishing Email | *Open Email Attachment* | Less than 5 times per day | 0.001 | 0.005 | $4.5 | $22.5 |
| | | More than 5 times per day | 0.004 | 0.02 | $18.0 | $90.0 |
| | *Request Blacklisted Website* | Less than once per month | 0.002 | 0.01 | $9.0 | $45.0 |
| | | More than once per month | 0.007 | 0.035 | $31.5 | $157.5 |
| | *Read Email from Smart Phone* | Yes | 0.003 | 0.021 | $13.5 | $94.5 |

FIG. 8

Sample Meta-Data Elements to Help Select and Prioritize Training Interventions

| 22 Available Training Interventions | Training Need Covered (Threat Scenario) | Risk Reduction (Per Threat Scenario) 1 week | Risk Reduction (Per Threat Scenario) 1 month | User Time Required | Prerequisite | 508 Compliance |
|---|---|---|---|---|---|---|
| URL Parsing Training Game | Infect Computer With a Virus | 75% | 55% | 6 min | None | Yes |
| | Disclose Sensitive Information | 80% | 60% | | | Yes |
| Mock Phishing Attack | Infect Computer With a Virus | 95% | 75% | 2 min | None | Yes |
| | Disclose Sensitive Information | 80% | 60% | | | Yes |
| Email Security Training Cartoon #25 | Disclose Sensitive Information | 25% | 5% | 1 min | None | No |
| Email Security Training Game | Infect Computer With a Virus | 50% | 35% | 8 min | None | Yes |
| | Disclose Sensitive Information | 50% | 40% | | | Yes |
| Smart Phone Security | Install Malicious App | 75% | 65% | 10 min | Module 101 | Yes |
| | Fall for SMS Phishing attack | 75% | 80% | | | Yes |
| | Have Phone Stolen | 75% | 80% | | | Yes |
| | Disclose Location on Social Network | 75% | 70% | | | Yes |
| | Bluetooth Attack | 75% | 80% | | | Yes |

CONTEXT-AWARE TRAINING SYSTEMS, APPARATUSES, AND METHODS

CROSS REFERENCE TO RELATED APPLICATION

This application claims the benefit under Title 35, United States Code §119(e), of U.S. Provisional Patent Application Ser. No. 61/473,384, filed Apr. 8, 2011 and entitled Behavior Sensitive Training System, which is hereby incorporated by reference in its entirety, and U.S. Provisional Patent Application Ser. No. 61/473,366, filed Apr. 8, 2011 and entitled System and Method for Teaching the Recognition of Fraudulent Messages by Identifying Traps Within the Message, which is hereby incorporated by reference in its entirety.

BACKGROUND

Technical Field of the Invention

This invention pertains generally to context-aware training and, particularly to training systems, apparatuses, and methods that select and provide training to a user based on action of a user.

BACKGROUND OF THE INVENTION

Computer-Based Training systems and other forms of electronically supported learning and teaching (generically referred to as e-Learning systems) have traditionally relied on one-size-fits all training material, where the same collection of modules has to be taken by everyone. These modules may come in many different forms, including videos, flash-based presentations, simulations, training games and more. Independently of their format, they traditionally follow a fixed curriculum, where a predefined sequence of modules is prescribed for groups of individuals. Intelligent tutoring systems have introduced more sophisticated forms of computer-based training, where one develops and refines models of what the learner knows, and dynamically adapts learning content presented to the learner as these models evolve. When well designed, these systems have been shown to result in better outcomes than more traditional training modules.

Accordingly, it may be desirable to have a computer based training system that leverages sensed activity or behavior information in combination with user needs models that map those activities or behaviors onto quantitative or qualitative metrics indicating how critical it is for users engaging in these particular activities and behaviors to be knowledgeable of and proficient in different topics or training areas. Thus, embodiments of the present invention include computer-implemented systems and methods to selectively prioritize those areas where the learner needs to be trained and to selectively identify conditions where delivery of the training is likely to be most effective. That level of customization is thought to be particularly valuable in domains where training content is vast or opportunities for training are limited (e.g. limited time), and where the training required by individual users varies based on their activities and behaviors. Identifying training needs based on static information (e.g. based solely on the department an employee works for, or his/her level of education) is thought to be insufficient in these domains. Sensing activities, behaviors, or other contextual attributes can help better target training and mitigate consequences associated with undesirable behaviors.

SUMMARY OF THE INVENTION

In an embodiment, the present invention includes a computer-implemented method for training a user. That method includes sensing, using a computer system that includes at least one processor, at least one action performed by the user, selecting, using the computer system, at least one training action from a collection of available training actions using a training needs model that estimates at least one of a cost and a benefit of exposing the user to at least one available training action or at least one combination of available training actions, based on the sensed at least one user action, if the sensed at least one user action indicates a need for the user to be trained and at least one relevant training action from the set of available training actions is identified; and delivering, using the computer system, the selected at least one training action to the user.

In another embodiment, the present invention includes a computer-implemented training system. In that embodiment, the computer-implemented computer system includes a sensor monitoring at least one action performed by the user, an output device proximate to the user, and a computer system that includes at least one processor. The computer system is coupled to the sensor and the output device and the computer system contains instructions which, when executed by the at least one processor, causes the computer system to receive data from the sensor, the data pertaining to the performance by the user of an action, analyze the data using a training needs model that estimates at least one of a cost and a benefit of exposing the user to at least one training action, based on the received data, if the data indicates a need for the user to be trained, select one or more training actions from a collection of training actions for use by the user, and provide the selected one or more training actions to the user through the output device.

Other embodiments, which may include one or more parts of the aforementioned system or method, are also contemplated, and may thus have a broader or different scope than the aforementioned system or method. Thus, the embodiments in this Summary of the Invention are mere examples, and are not intended to limit or define the scope of the invention or claims.

Accordingly, the present invention provides solutions to the shortcomings of prior training systems and methods. Those of ordinary skill in training will readily appreciate, therefore, that those details described above and other details, features, and advantages of the present invention will become further apparent in the following detailed description of the preferred embodiments of the invention.

BRIEF DESCRIPTION OF THE FIGURES

The accompanying drawings, which are incorporated herein and constitute part of this specification, and wherein like reference numerals are used to designate like components, include one or more embodiments of the invention and, together with a general description given above and a detailed description given below, serve to disclose principles of embodiments of behavior sensitive training.

FIG. 5 illustrates one example of a collection of cyber security training sensors that may be used in a context-aware cybersecurity training system and ways in which those sensors can be implemented;

FIG. 7 illustrates an embodiment of a partial training needs model based on simple threshold levels;

FIG. 8 illustrates elements of another embodiment of a training needs model; and FIG. 9 illustrates elements of an embodiment of a context-aware cybersecurity training system.

DETAILED DESCRIPTION OF THE INVENTION

Figure 1:
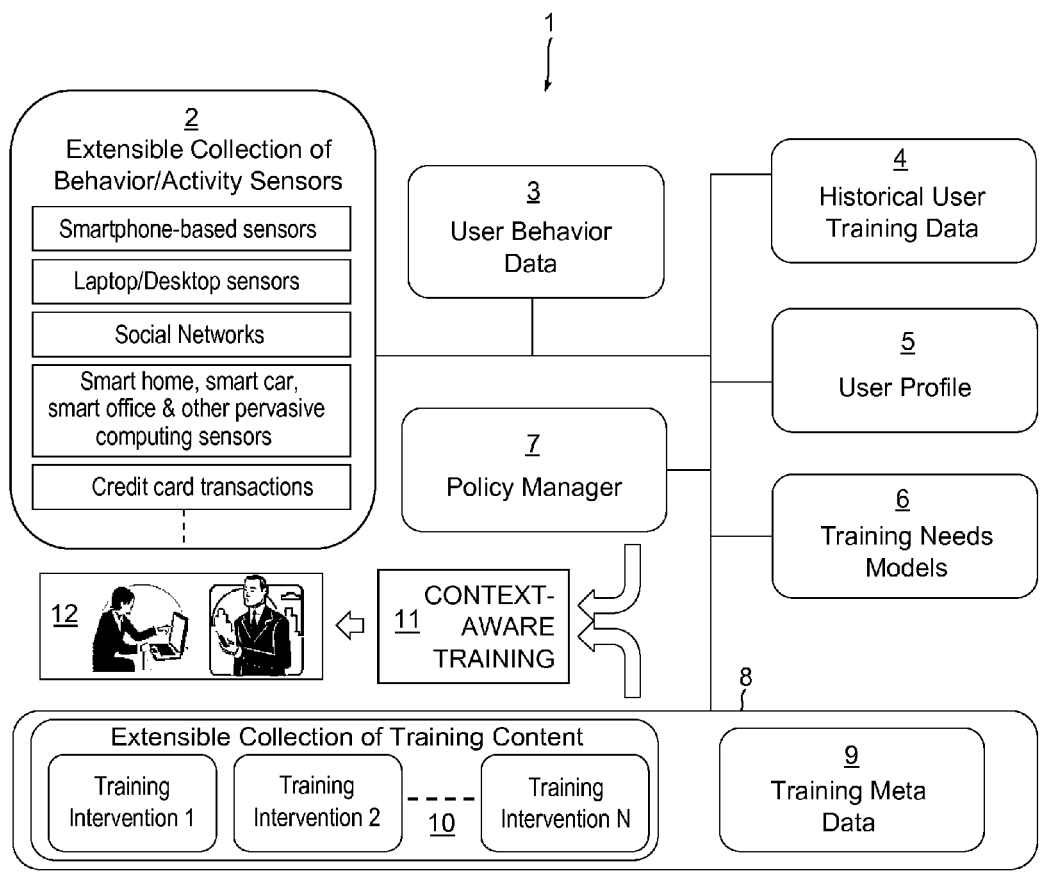
FIG. 1 illustrates one example of a suitable computing system environment in which the described embodiments may be implemented.

In the following description, the present invention is set forth in the context of various alternative embodiments and implementations involving context-aware training systems, apparatuses, and methods. It will be appreciated that these embodiments and implementations are illustrative and various aspects of the invention may have applicability beyond the specifically described contexts. Furthermore, it is to be understood that these embodiments and implementations are not limited to the particular compositions, methodologies, or protocols described, as these may vary. The terminology used in the following description is for the purpose of illustrating the particular versions or embodiments only, and is not intended to limit their scope in the present disclosure which will be limited only by the appended claims.

Throughout the specification, reference to "one embodiment," "an embodiment," or "some embodiments" means that a particular described feature, structure, or characteristic is included in at least one embodiment. Thus appearances of the phrases "in one embodiment," "in an embodiment," or "in some embodiments" in various places throughout this specification are not necessarily all referring to the same embodiment. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments. References to "or" are furthermore intended as inclusive, so "or" may indicate one or another of the ored terms or more than one ored term.

Various embodiments of context-aware training are directed to apparatuses, systems, and methods performing context-aware training. It will be appreciated by those skilled in the art, however, that a computer system may be assembled from any combination of devices with embedded processing capability, for example, computer, smart phone, tablet or other devices, including mobile or pervasive computing devices or appliances, electromechanical devices, and the like. The computer system can be configured to identify training interventions (or "training actions") relevant to individual users and push those training interventions to users, both pro-actively (in anticipation of future needs) or reactively (in response to a need as it arises).

Numerous specific details are set forth in the specification and illustrated in the accompanying drawings to provide an understanding of the overall structure, function, manufacture, and use of embodiments of context-aware training. It will be understood by those skilled in the art, however, that the invention may be practiced without the specific details provided in the described embodiments. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined by the appended claims.

FIG. 1 illustrates an embodiment of a context-aware training system 1. That embodiment of the context-aware training system comprises one or more sensors 2, user behavior data 3, historical user training data 4, static user profiles 5, training needs models 6, a policy manager 7, training content data 8, training meta-data 9, an extensible collection of user-oriented training content 10, and behavior sensitive training 11 for delivery to a user 12.

The one or more sensors 2 monitor one or more aspects of a user's behavior or activities ("user actions"). Those user actions may include sensing the behavior of people other than the user (regardless of whether they are a user of the system), the behavior of other entities (e.g. organisms, organization, the environment) with which a given user interacts (e.g. sensing how they respond to actions by the user), and other relevant contextual attributes. Those sensors 2 as well as other elements of the training system may be operated by one or more entities and may be deployed across a wide range of geographies, including different jurisdictional boundaries.

Behavior or activity data 3 may be recorded over time in one or more data storage devices 1012 (shown in FIG. 3), and may include relevant statistics. Those relevant statistics may include, for example, frequency of certain activities, frequency of certain behaviors, deviations from relevant baselines, and relevant trends.

Behavior or activity data 3 may further be used in combination with historical user training data 4 which may be stored in one or more data storage devices 1012 and may include data related to the training one or more users have taken in the past. Historical user training data 4 may include information including when, and how well one or more users performed in prior training or assessments. For example, static user profiles 5 which may include a role of one or more individual user in the organization, their education levels, or demographic information for example, and may be stored in one or more data storage devices 1012, may be used in combination with the historic user training data.

Training needs models 6 may be stored in one or more data storage devices 1012 and may correlate one or more behaviors or activities with training that is relevant to those behaviors or activities. Training needs models 6 may be qualitative or quantitative in nature, and may include a mixture of both qualitative and quantitative aspects. Training needs models 6 may vary in complexity, ranging from simple "if-then" rules, for example, that map patterns of sensed data with training content typically required by people whose activity or behavior matches a given pattern, to more complex quantitative models that, for example, take into account considerations such as the probability that a user requires some type of training, the time it takes to take the training, the relative effectiveness of available training modules in addressing a training need, the type of a training a given user has taken in the past, the amount of time available to train the user and more.

A policy manager 7, which may be stored in one or more data storage devices 1012, may include instructions that may be executed by a processor. In one embodiment, the policy manager 7, is in charge of analyzing user behavior data 3, possibly in combination with information such as: (a) historical user training data 4 for the user, other similar users, or both, (b) static profile data 5 such as the role of the user and the education level of the user. The policy manager 7 analysis is conducted in light of one or more relevant training needs models 6. The policy manager 7 selects at least one training intervention 11 from an extensible collection of training interventions 11 ("context-aware training content") to be pushed or provided to the user 12.

Training content data 8 may be organized in the form of an extensible collection of training modules 10 and training meta data 9. The extensible collection of training modules 10 may range from very short training interventions intended to be delivered in a just-in-time fashion, to longer, more extensive training modules that users may be encouraged or required to be taken within a predetermined period of time. Training interventions 10 along with relevant training meta-data 9 may be stored in one or more data storage devices 1012. Relevant training meta-data 9 for a training intervention may include information about the training needs the training intervention is designed to address, the format in which the training intervention can be delivered, the amount of time the training intervention typically requires, estimated effectiveness of the training intervention (possibly across all users or possibly for a subset of users based on considerations such as level of education, age, gender, prior training to which the users have been exposed) and other relevant considerations. The training meta-data 9 may include annotations and those annotations may be used by a policy manager 7 to select training content that is most appropriate for one or more users and when to provide that training content to the user or user group. Some training interventions may also be customizable based on relevant contextual information, such as the activities the user is engaged in, time available to train the user, available devices to deliver the content, preferred user language, demographic information and other contextual information.

The extensible collection of training interventions can change over time. For example, the extensible collection of training interventions may have training interventions deleted, added or modified. The training interventions can also be provided by different sources including, for example, corporate training developed in-house, external training interventions provided by vendors, training interventions obtained via personal subscriptions, and training interventions offered by service providers such as a doctor, a dietician, or a health club. In addition to the possibility that training interventions may vary over time, available sensors and other sources of contextual information may also vary over time. For example, a user may acquire a new mobile phone with additional sensors, new data about the user may be collected by a new source, and a new source of data may become able to interface with the context-aware training system.

Sensed data about user behavior and activities can include activities conducted in cyber space, activities in the physical world or a combination thereof. Sensed data may include any activity or behavior that can be tracked, observed, or recorded in some manner, for example, driving behavior, table manners, physical, mental and social health-related activities and habits, professional activities, social activities, etc. Sensed data may also include data relating to the behavior of people (not necessarily users of the system) with whom the user interacts in some manner. For example, sensed data may include responses received by the user from people, organisms, objects, surrounding elements or other entities with whom the user interacts, whether directly or indirectly.

Sensed data may also be provided by a system administrator via an administrator client 1014. Sensed data could include information such as the scheduled deployment of corporate smart phones. Such sensed data, when processed by the policy manager 7 based on training needs models, can help anticipate the need to train employees in the area of smart phone security and can result in the assignment of smart phone security training interventions to those employees.

One or more sensors 2 can include one or more devices, artifacts or other sources of information. For example, sensors 2 can include hardware, software, electromechanical devices, bio-sensory devices, and sources of information provided by third parties. Sensors 2 can be used to sense one or more aspects of a user's activities or behavior, whether in the context of routine activities or in response to artificially created situations (e.g. a mock situation or exercise created to evaluate a user's response). The sensors 2 can be embedded in or interfacing with smart phones, laptop computers, desktops, tablets, e-readers, body parts, or any other devices, appliances or elements of the user's local or global environment (e.g. smart home, smart car, smart office, or other mobile or pervasive computing device or appliance, including medical devices, water quality sensors, surveillance cameras, and other environmental sensors). The sensor 2 can include a data storage device or processor, for example in microprocessor form, and can obtain data provided by the user, by people other than the user, by organizations, or by entities including colleagues, friends, family members, strangers, doctors. The sensor 2 can alternately or in addition obtain data provided by systems (including data aggregated and synthesized from multiple sources, including aerial sensors, space-based sensors, implanted devices, and medical devices). For example, the sensor 2 can sense calendar information, status updates on social networks, and credit card transactions and can sense information or actions obtained through video surveillance. The sensor 2 can also sense a combination of data.

User behavior data 3 can be captured and recorded in one or more locations and may include relevant statistics, such as frequency associated with different types of events or situations, trends, and comparisons against relevant baselines. Such user behavior data 3 may help create a unique profile for each individual user that captures this user's activities and behaviors at a particular point in time or over different periods of time.

Historical user training data 4 may inform the selection of relevant training for a user by capturing the training history of that user. Historical user training data 4 may, include the training modules to which that user has already been exposed, how often and when that user was exposed to training modules, how well the user responded when taking the training modules, and other indicators of the user's proficiency in the area or areas in which the user has been trained. User proficiency can include, for example, recorded instances where the user failed to conform to expected best practices or apply relevant knowledge covered by the training system.

An example of a domain that can benefit from sensing user behavior is cyber security training and awareness for everyday users. The complexity of today's computers, including cell phones, tablets and other computer-powered or Internet-enabled devices, and networking systems make them vulnerable to an ever-wider range of attacks. Human users who adopt best practices and strategies (e.g. not falling for Internet-enabled social engineering attacks, regularly checking and installing software patches, adopting safe browsing practices, safe USB memory practices, safe password management practices, etc.) can often help reduce their exposure to many of those threats. Training everyday users to adopt improved strategies that address potential threats can be a daunting task. Accordingly, an effective way to mitigate risks is to prioritize training for individual users based on the threats to which they are most likely to be exposed by taking into account information about user activities or behaviors and/or other relevant contextual attributes such as their prior training history and level of expertise.

Figure 2:
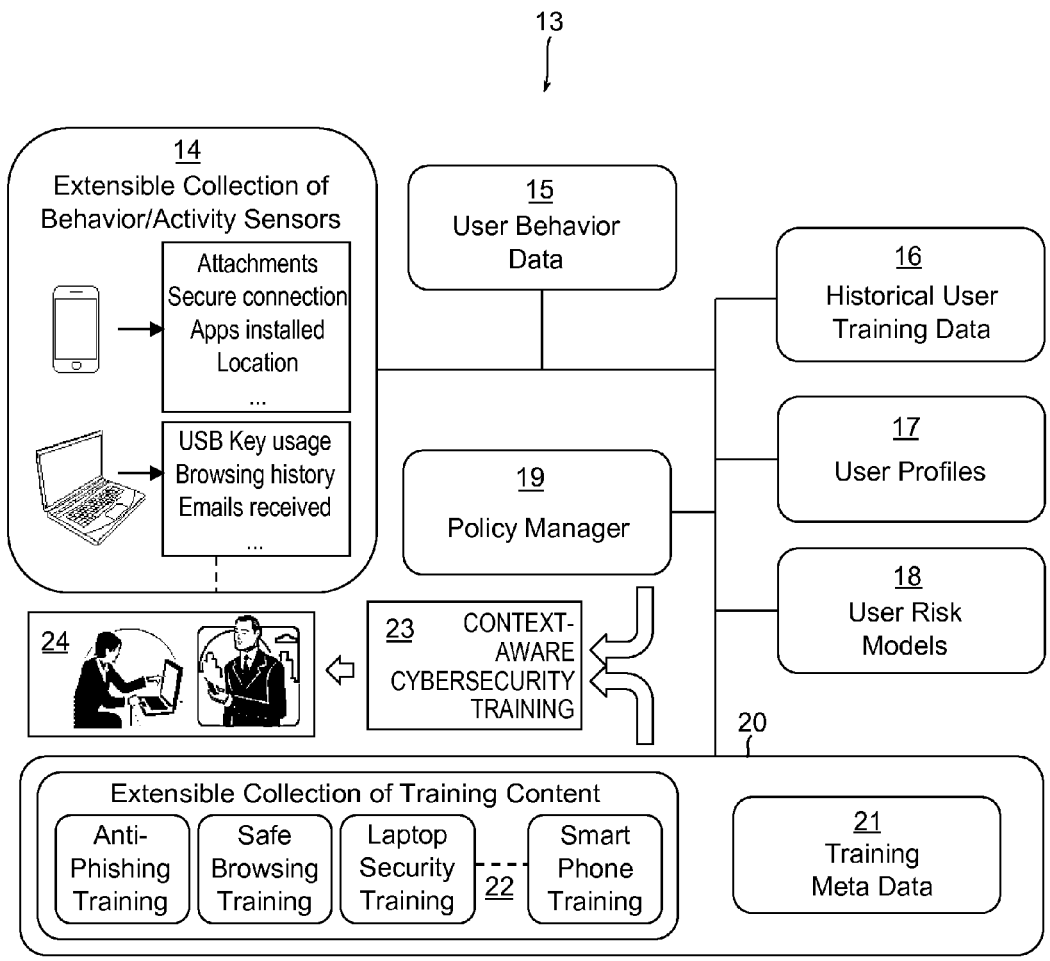
FIG. 2 illustrates a particular configuration of such an environment tailored for cyber security training of users.

FIG. 2 illustrates an embodiment of a context-aware system for cyber security training 13. In the cyber security training domain, training needs models can take the form of risk models, including threat models which may be stored in one or more data storage devices 1012. For example, the context-aware system for cyber security training 13 may include training needs models that address threats that tend to accompany certain types of activities, behaviors and other contextual attributes. For example, a user browsing the web may be subject to one or more threats that are associated with accessing websites that host malware. A Web browser can be instrumented to act as a sensor 14, monitoring the browsing habits of a user, which may include monitoring the variety or type of sites the user visits and, possibly, the frequency of these visits. Sensed information, in turn, can be used to assess the risk associated with the threat of the user being exposed to malware while browsing. Such risk assessment coupled with other elements of the training needs or user risk model can be used to identify specific browsing strategies from which the user may benefit. The user risk models may be supplemented with meta-data about available training interventions and other relevant elements of the context (e.g. available devices to deliver training intervention, available time, historical training history) of the user to help the policy manager 7 identify one or more training interventions 22 that can help train the user to adopt the identified browsing strategies.

Examples of behavior or activity sensors 14 in the cyber security training domain include sensors that detect attachments in emails sent or received by a user, sensors to determine whether one or more users access different services over secure connections, sensors to identify the number, type and/or identity of applications installed on a user's mobile phone, and sensors to track the locations, including Internet web pages, a user visits. Sensors 14 can also include, for instance, sensors to detect USB key usage, record browsing history, identify Bluetooth headset use, sensors that detect the number or types of emails received, sensors that inspect the content of emails, and sensors that track the physical location of users.

In this domain, one embodiment of the invention includes a policy manager 19, which may be performed by a processor, such as a processor that is part of an analysis host computer 1010 (illustrated in FIG. 3). the policy manager can use in its analysis user behavior data 15, historical user training data 16, static user information including user profile information 17, demographic information, and training needs models such as the user risk models 18). The policy manager 19 may use any meaningful subset of such data 15, 16, 17, 18, and 21, and generate a prioritized set of cyber security training interventions 23 to be pushed or delivered to the user 24, where the cyber security training interventions 23 may be selected from an extensible collection of cyber securing training interventions 22. One or more of the available cybersecurity training interventions 22 may include just-in-time training interventions as well as more traditional training modules. The training interventions and may be annotated with relevant training meta-data 21 to facilitate identification and prioritization by the Policy Manager 19. In the cybersecurity training domain where a user's time is limited and there is an increasingly vast amount of cybersecurity best practices and strategies to which the user should ideally be exposed, the policy manager 19 can use its input to identify and possibly prioritize one or more training interventions 22 in a way that will minimize, or at least help reduce, the chances users fall prey to those threats to which they are most susceptible based on their activities, behavior, training history and/or other relevant contextual attributes.

The policy manager 19 may operate autonomously or according to a mixed initiative mode. In a mixed initiative mode, a system administrator (e.g. a security analyst, a member of human resources in charge of training, or some other role in an organization) uses an administrator client 1014 to interact with the policy manager (e.g., 19 in the embodiment illustrated in FIGS. 2 and 7 in the embodiments depicted in FIGS. 1 and 3). In the mixed initiative mode, the system administrator may review results of the analysis conducted by the policy manager 19 and select one or more training interventions to address those training needs for which one or more users are at a particularly high risk. In that embodiment, the system administrator could include launching a training campaign based on a special purpose cartoon to train all those employees who are scheduled to take their corporate laptops out of the country in the next two weeks because, based on the system's training needs model, those employees have been identified as being at a particularly high risk for laptop-related threat scenarios by the analysis conducted by the policy manager 19.

Figure 3:
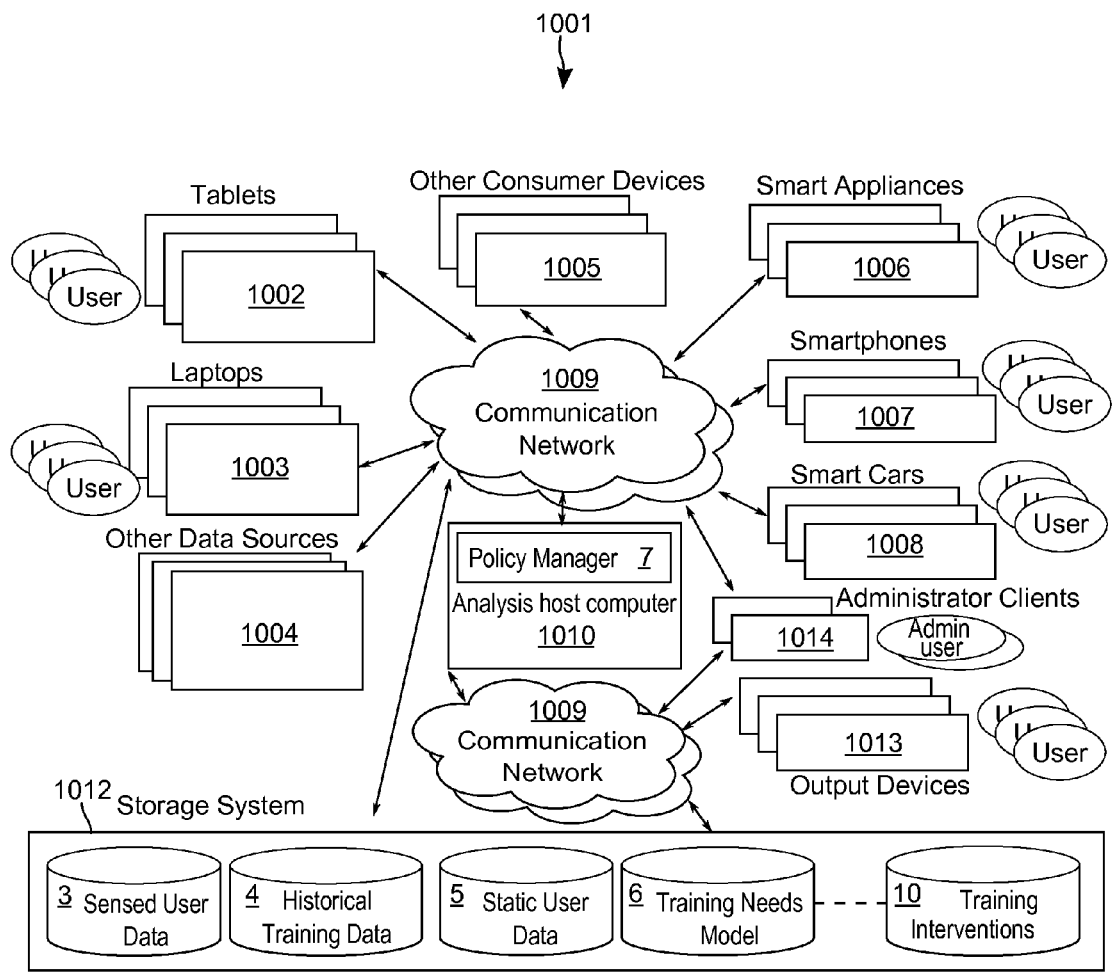
FIG. 3 illustrates a hardware configuration for an embodiment of context-aware training.

FIG. 3 illustrates a simplified view of a hardware configuration 1001 of a context-aware training system that may be used to facilitate the sensing and analysis of user activities and behaviors. The context-aware training system 1 may perform one or more embodiments of the methods discussed in connection with FIGS. 2-3 and generally herein. Thus, any of the methods provided herein may be, in various embodiments, performed using a processor of one or more of the computers of the system 1001. The configuration may include an analysis host computer 1010 connected via one or more communications networks 1009 to a one or more computers, which may include:

i. devices capable of sensing relevant elements of a user's activities, behavior and more general context such as tablets 1002, laptop computers 1003, other consumer devices 1005 such as cameras, wristwatches, smart appliances 1006 including smart televisions and refrigerators, smartphones 1007, smart cars 1008, and other sensing devices not represented in the figure such as, for example RFID readers, heart rate monitors, cameras, and hardware and software sensors 2 capable of sensing different types of activities and behaviors, including the effects of actions by the user on himself, other people, other organisms, or elements of his surrounding environment;

ii. other data sources 1004 such as social networks, satellite imagery, public records, company records, criminal records, health, and financial records; and iii. devices capable of delivering training interventions to users such as tablets 1002, laptop computers 1003, smart appliances 1006, smartphones 1007 and other types of output devices 1013.

In general different training interventions may utilize different delivery devices, some just with output capability, others with different combinations of output and input functionality.

The system may include a storage system 1012, which may comprise a plurality of storage devices, including cloud-based devices, possibly located across a plurality of locations. The storage system 1012 may serve as repository for static user data 5, recorded data collected from one or more sensors 2, historical user training data 4, and training needs models 6. The storage system 1012 may also store part or all of the training content 10 and training meta-data 11 available to the context-aware training system.

The computers 1002, 1003, 1007, 1010 and other devices 1005, 1006 and artifacts 1008, 1013 may be computers or computer systems as described above and may each include at least one processor and possibly one or more other components of a computer or network of computers. For example, the analysis host computer 1010 may be a single server or could be a distributed computing platform or a cloud-based system running software such as Microsoft WINDOWS, Linux or UNIX. The client configuration, participant computers, which may include one or more laptops 1003, tablets 1002, smart phones 1007, administrator devices 1014 or output devices 1013, may themselves comprise a collection of participant computers capable of network connectivity. Those devices 1002, 1003, 1007, 1013, and 1014 may support any number of input and output functions. Those input and output functions may be embedded in the devices themselves or may be provided by satellite hardware such as a keyboard, mouse, display, or speaker. Devices may be connected to the network either through a physical hardwire connection or through wireless technology such as 802.11 WiFi, BLUETOOTH, near field communication (NFC), or GSM/CDMA/LTE cellular networks, or through other communication methods or systems. The operating system of each participant computer could include Microsoft WINDOWS, Linux, UNIX, Mac OSX, Android ANDROID, iOS, PALM, or another operating system. When relevant the computers 1002, 1003, 1007, 1013, and 1014 may run browser software such as, for example, MOZILLA, INTERNET EXPLORER (IE), SAFARI, CHROME or another browser software or browsing methodology. The type and configuration of the participant computers (e.g. 1002, 1003, 1007, 1010) can be otherwise configured as desired.

The communication networks 1009 could be any type of data or computer communication network or any other technology enabling computers and possibly other devices or appliances to communicate with one another.

Figure 4:
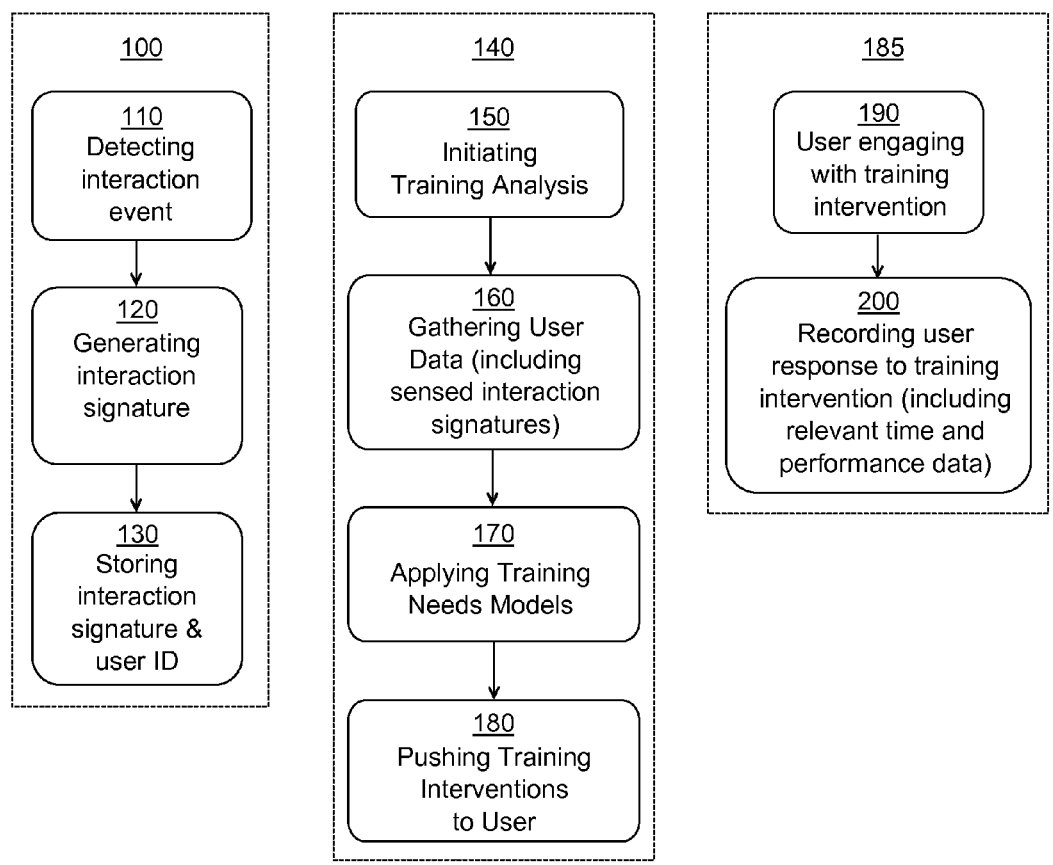
FIG. 4 illustrates an embodiment of context-aware training workflow.

In one embodiment, the methods discussed herein with respect to FIGS. 1,2 and 4 are performed by at least one computer using at least one processor, such as by one or more computers described with respect to the system 1 of FIG. 1, system 13 of FIG. 2, or system 1001 of FIG. 3 as described, or one or more other computers and processors in other embodiments.

One embodiment of a method of context-aware training that may be performed, for example, by one or more of the components illustrated in FIG. 3, is illustrated in FIG. 4. Three processes are illustrated in that embodiment: a user action process 100, a policy management process, 140 and a response process 185.

The user action process includes detecting an interaction event at 110. When detecting an interaction event at 110 in this embodiment, a sensor 2 detects the interaction event, which corresponds to user activities or behaviors or, more generally, other contextual attributes relevant to the training available. Such contextual attributes may include any relevant sensory data as well as information obtained from other relevant sources of information, such as browser history, credit card records, surveillance cameras, electronic doors, employment records, information collected about a person with which the user has interacted, and social networking information. In one instance, a software or executable program will run on a participant computer or device (e.g. 1002, 1003, 1005, 1006, 1007, 1008) and locally process sensed data to detect one or more relevant interaction events prior to forwarding the detected information (e.g. in the form of interaction signatures) to a storage system 1012. In some embodiments, user data 3 can be forwarded directly to the analysis host computer 1010. The storage system may be responsible, among other things, for storing sensed user data 3. Detecting an interaction event 110 may include filtering sensed data, aggregation of sensed data, pre-processing of the sensed data, analysis of the sensed data, and/or generation of one or more event signatures 120.

The "interaction" does not have to be known to the user. Rather the term interaction here is intended to also include the detection of a particular behavior or activity by one or more sensors. This could include a browser-based sensor to detect that a user visits potentially harmful websites or a camera coupled with a computer vision program to detect a particular activity or behavior (e.g. driver drowsiness or bad table manners).

The user action process may include generating an interaction signature at 120, though in some embodiments raw sensor data may be stored, as shown at 130, or directly forwarded to the analysis host computer 1010. The interaction signature can be produced in various ways including using cryptographic hash functions. In some embodiments, sources of sensory data may forward sensed information to one or more other participant computers shown or not shown in FIG. 3.

The interaction signature, sensed information and, when appropriate, the identity of the user to which the interaction signature corresponds, may be forwarded to a storage system 1012 responsible, among other things, for storing sensed user data 3 at 130. In other embodiments of the method of context-aware training, sensed information may be directly communicated to an analysis host computer 1010 responsible for hosting the policy manager 7 functionality enabling the policy manager 7 to immediately analyze the sensed information based on relevant training needs models 6.

The policy management process 140 includes initiating training analysis at 150 and, when appropriate, identifying one or more relevant training interventions from a collection of available training interventions, including possibly just-in-time training interventions. The policy manager 7 is responsible for determining, and possibly prioritizing, the training content to be pushed to individual users. The policy manager 7, in this embodiment initiates a training analysis process 150 for one or more users and collecting relevant user data 160 that may be beneficial in conducting the training analysis 150. Gathering user data 160 may include accessing static user data and sensed user data. Sensed user data may include relevant contextual data, whether obtained directly from a sensing device 2 or participant computer, or whether obtained from parts of a storage system storing sensed user data. Gathering user data 160 may also include retrieving relevant historical training data 4, retrieving relevant training needs models 6 (to the extent that they are not stored locally on the analysis host computer 1010), and/or retrieving training meta-data 9 about available training interventions. The Policy Manager 7 applies training needs models 6 to determine which training interventions to push to the user and, when relevant, how to prioritize these training interventions.

Embodiments of the policy manager 7 may operate according to one or more modes. Those policy manager modes include scheduled modes, routine modes, real-time modes, mixed-initiative modes and combinations thereof. In an embodiment of context aware training in which a scheduled mode is utilized, the policy manager 7 regularly assesses the overall training needs of a plurality of individual users and reprioritizes training content to be pushed or delivered to each individual user. In some embodiments, that process may be fully automated. In other embodiments, that process may follow a mixed-initiative mode, where an administrative user (e.g. a system administrator, a member of personnel in charge of training, an analyst or some other suitable person, including possibly the user himself) reviews, via an administrator client 1014, analysis results produced by the policy manager (i.e., 7 in FIGS. 1 and 3 and 19 in FIG. 2). Based on the analysis results produced by the policy manager i.e., 7 in FIGS. 1 and 3 and 19 in FIG. 2), the system administrator may further select or prioritize training interventions that will be delivered to one or more users. In particular, for example, the system administrator may launch a training campaign for a group of users whose estimated training need in a given area is above a certain threshold level. In another instance, a system administrator could select all those users who failed recent assessments via one or more mock phishing attacks and who also regularly read email using their smart phones, to be exposed to a cyber security training intervention intended to teach them how to better protect themselves from phishing attacks. Such a training intervention could also include the system administrator or policy manager 7 identifying groups of users who are perceived to be at particularly high risk for a combination of threat scenarios and scheduling training campaigns for those users involving one or more training interventions that specifically address those training needs.

Regular assessment of user training needs may involve running in batch mode, where all users are being reviewed in one batch or where different groups of users are processed in different batches, possibly according to different schedules. Regular assessment of user training needs may also include pushing short security quizzes and creating mock situations aimed at better evaluating the needs of an individual user or a group of users. In a real-time mode, the policy manager 7 operates in an event-driven manner enabling it to more rapidly detect changes in user behavior or activities and other relevant contextual attributes, and to more quickly push training interventions that reflect the risks to which the user is exposed at a desired time. Any of those modes can be implemented in the form of simple rules or more complex logic that can potentially be customized and refined by an organization where, for instance, the organization is using administrator client software interfaces 1014. The rules or more complex logic can also be defined to allow for mixed initiative iterations with system administrators and users, where results from the analysis performed by the policy manager 7 are shown to the user and the user can interact with the policy manager 7 to refine the analysis, evaluate different options, and possibly finalize the selection, prioritization and scheduling of training interventions, whether for individual users or groups of users. The rules and/or logic may be manually configured by system administrators, programmers or other qualified personnel (whether working for the organization providing the context-aware training system, for a customer organization, for a contractor working for either of those organizations, or by some other individual or group of individuals) or derived through statistical analysis or data mining techniques, or a combination of both. The administrator client software interface may also allow administrators to maintain and customize training needs models and other relevant parameters, data elements and elements of functionality of the context-aware training system. Maintenance and customization may include updating and customizing the collection of available training interventions, and updating and customizing individual training interventions, including associated meta-data (e.g. pre-requisites, compatible delivery platforms, required time, effectiveness and other meta-data). Maintenance and customization may also include accessing, reviewing and manipulating other relevant system data, including static user data, sensed user data, historical training data, and other meta-data.

Once relevant training interventions have been identified by the policy manager 7 for one or more users, those interventions may be delivered or pushed to the user at 180. Delivery of training interventions, which may include training content, may be performed in a number of ways, including sending relevant training interventions directly to one or more output devices capable of delivering the identified interventions to the user. Delivering training interventions may also be performed by updating a schedule indicating when training interventions should be delivered or otherwise exposed to the user, or updating a schedule that will be exposed to the user, possibly with a combination of required and recommended training content for engagement by the user. Training interventions may include one or more dates by which the user should experience the training intervention, proficiency levels that may have to be achieved by the user while engaging with the training content (e.g. training quiz, training game, simulation exercise, responses to mock situations and other interactive types of interventions). Training interventions may also be performed through a combination of types of interventions including, for example, a delivery of a combination of just-in-time training interventions to the user, training assignments to be completed by the user by assigned dates or times, and recommendations for further training of the user. Training intervention, including training content, assignments, and recommendations, may also be provided to the user by other relevant means.

Training interventions may include the creation of mock situations, whether through fully automated processes (e.g. automated delivery of SMS phishing messages to a number of users), or manual processes (e.g. activating personnel responsible for creating mock situations such as mock impersonation phone calls intended to train people not to fall for social engineering attacks), or hybrid processes (e.g. mock USB memory attack, where a USB includes fake malware intended to train one or more users not to plug USB memory sticks into a computer and further wherein such USB memory devices are manually scattered around an office to lure employees to pick them up). Training interventions may come in many different formats, ranging from video and audio content, to cartoons, alerts (e.g. alarms, flashing lights), training interventions involving personnel (e.g. a phone call from the boss of a user, a training session with a certified instructor, a conversation with the parent of a user, a session with a dietician), or any combination of the above or any other relevant format by which training content may be delivered to a user.

In the response process 185, as users engage with the training interventions 190, their responses may be recorded in part or in whole 200. That response data itself may be analyzed in real-time by the policy manager 7 or may be stored in an appropriate format, possibly for later analysis, (whether in raw form or in summarized form) in a part of the storage system 1012 responsible for storing historical training data or in a part of the storage system responsible for storing user behavior data 3, or some other relevant storage, or any combination of the above. Response data may include whether the user experiences the training, when the user experiences the training, how long the user takes to experience the training, whether the user's behavior changes after taking the training, the level of proficiency exhibited by the user while taking the training (e.g. in the case of an interactive training module), changes in the behaviors or responses of people the user interacts with after taking the training, or any other relevant data.

FIG. 5 illustrates an embodiment of a partial list of possible sensors that may be used in a context-aware cybersecurity training system. Some of the sensors listed in the figure are themselves aggregating data they collect from other sensors such as device drivers, browsers, operating system components, and more. User behavior data 3 collected from those sensors 2 may be directly interpreted by a policy manager (i.e., 7 in FIGS. 1 and 19 in FIG. 2) running on an analysis host computer 1010 or can be recorded in a data storage system 1012 for later analysis.

In the case of an embodiment of a context-aware cybersecurity training system, sensed user data 3 is analyzed to identify threat scenarios for which a user in a given context is most susceptible or most at risk.

Figure 6:
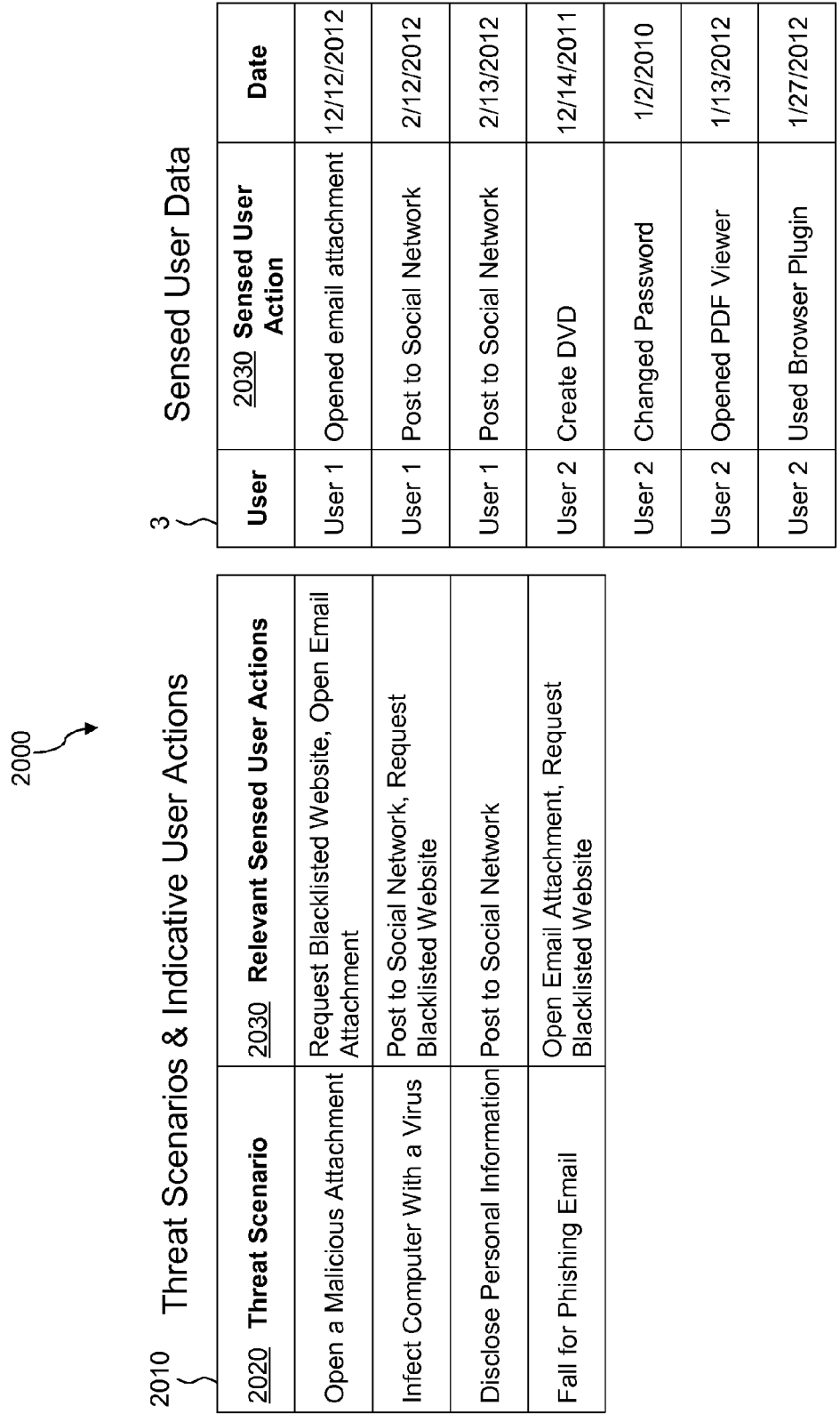
FIG. 6 illustrates an embodiment of a partial list of possible threat scenarios a context-aware cybersecurity training system may monitor.

FIG. 6 illustrates an embodiment of a partial list of possible threat scenarios 2020 a context-aware cybersecurity training system may monitor. Assessing a user's exposure to one or more threats or threat scenarios 2010 can benefit from sensing a plurality of indicative user actions 2030. For instance, assessment of the risk associated with a user falling for an email phishing threat scenario can benefit from monitoring activities that include how often a user opens email attachments or whether and how often the user attempts to access blacklisted websites.

An embodiment of a partial training needs model 6 based on simple threshold levels is illustrated in FIG. 7. For instance, a user who reads email from his smartphone is identified as being at a high risk of falling for a phishing attack in that embodiment. The training needs model associated with this particular threat scenario based on this particular combination of contextual attributes (in this case simply the fact that the user reads email from his smart phone) indicates that the user is in a high need for being trained in the area of email security and smart phone security, the identified training needs 3020 associated with this particular threat scenario as identified for this particular user in this particular context.

A user may be identified as being at high risk for a number of different possible threat scenarios. In one embodiment, the policy manager 7 is responsible for consolidating the training needs identified for the user and for identifying a suitable and possibly prioritized collection of training actions, based on considerations such as the collection of training interventions available for addressing the collection of training needs identified by the model.

Some training interventions can address more than one training need. For instance a smart phone security training module may address both smart phone security at large as well as phishing emails in the context of smart phones. Training actions selected by the policy manager may include immediate, just-in-time training interventions, assignments of training interventions the user should take by a certain date, and recommendations for additional training.

Elements of an embodiment of a slightly more complex training needs model 4000 based on risk models is illustrated in FIG. 8. In this embodiment, the training risk model relies on estimates of the susceptibility of a given user to fall victim to a given threat scenario 020 based on the frequency of different activities tracked by the system's sensors 2030. Susceptibility estimates 4020 can be probabilities, can be based on historical data, can be maintained by security analysts, and can be estimated with the help of data mining techniques. Susceptibility estimates can be maintained for different time horizons such as 24-hour and 1-week periods to help the policy manager 7 identify training interventions that could beneficially urgently be delivered to the user, and training interventions that can be assigned to be taken within a longer time window (e.g. a few days, a week or even a month). Twenty-four-hour susceptibility and one-week susceptibility estimates may be related in different ways. For instance, some activities may be performed 5 days per week, whereas others may be performed at different frequencies (e.g. 1 day per month or 7 days per week). Elements of the quantitative training needs model illustrated in FIG. 8 combine estimates of susceptibility and estimates of the cost 4010 associated with different threat scenarios to compute the risk associated with each threat scenario and possibly individual training needs for a given user in a given context. Using the model illustrated in FIG. 8, the policy manager 7 can identify a combination of one or more training interventions that will best mitigate the various risks to which a given user is susceptible at a particular point in time. That identification may include prioritizing identified training interventions, including differentiating between interventions that should be delivered right away and interventions that can wait a bit longer before being exposed to the user.

The particular format of the model shown in FIG. 8 is illustrative of different types of training needs models envisioned in the invention. It will be appreciated by those skilled in the art that similar considerations can be captured through different quantitative and qualitative variations of the training needs model illustrated in FIG. 8. Format variations include variations that rely on different ways of breaking down model elements aimed at capturing probabilities, costs, risks and reductions in risk associated with exposing different training interventions to a user.

FIG. 9 further illustrates elements of an embodiment of a context-aware cybersecurity training system. Specifically, FIG. 9 illustrates parts of the data elements 5000 used by the policy manager 7 to combine results from its analysis based on training needs models with meta-data about available training needs interventions. The meta-data may include, for various training interventions, one or more types of threat scenarios the intervention is designed to address, the effectiveness of the intervention to reduce susceptibility to identified threat scenarios, the time it takes to deliver one or more training interventions to a user, the different access devices on which the training interventions can be delivered, a list of possible customization parameters (which may include, for example, elements of the training content, level of complexity, duration, and examples used to train the user), the expected medium and long-term retention of the knowledge the training intervention teaches, the languages in which the training intervention is available, whether the training intervention is available for visually impaired users, or a variety of other meta-data. Those skilled in the art will appreciate that many other considerations can be captured in such a model and that these considerations can be captured through different types of quantitative and qualitative models that can be exploited by the policy manager (i.e., 7 in FIGS. 1 and 3 or 19 in FIG. 2).

In another embodiment, a computer-implemented training system is contemplated in which a user computing device (i.e., 1002, 1003, 1005, 1006, 1007, and 1008 illustrated in FIG. 3) communicates with a remote analysis host computer 1010. The computer-implemented training system includes an input device for receiving user input or a user action and a first processor coupled to the input device. The first processor has instructions which, when executed by the first processor, cause the first processor to receive a user initiated input from an input device, transmit an action associated with the input to a second processor, receive a training action from the second processor, and provide the training action to the user. The computer implemented training system may also receive at least one input provided at the input device in response to the provision of the training action and transmit the at least one input provided in response to the provision of the training action to the second processor.

In another embodiment in which a user computing device (i.e., 1002, 1003, 1005, 1006, 1007, and 1008 illustrated in FIG. 3) communicates with a remote analysis host computer 1010, the analysis host computer 1010 receives the user input or user action from the user computing device (i.e., 1002, 1003, 1005, 1006, 1007, and 1008 illustrated in FIG. 3), determines whether a need for training is indicated by the user input or action, selects a training intervention appropriate for the user input or action, and transmits the training intervention to the first processor if a need for training is indicated by the user input or action. The analysis host computer 1010 may also receive feedback, which may be in the form of additional user inputs, from user interaction with the training intervention and may further transmit additional training interventions or training intervention feedback to the user computing device (i.e., 1002, 1003, 1005, 1006, 1007, and 1008 illustrated in FIG. 3).

The user in embodiments of context-aware training could be a human user or, for example, a robot, a cyber entity, an organism, an organization, a trainable entity, or a group or subset of those users. Examples of cyber entities include intelligent agents, such as Siri on the iPhone, an avatar in a virtual environment, or a character in a computer game.

Examples of the training interventions and meta-data described in FIG. 9 include training interventions commercialized by Wombat Security Technologies (e.g. Wombat Security Technologies smart phone security training module, its Anti-Phishing Phil™ Training Game, its Anti-Phishing Phyllis™ Training Module, its training cartoons, its safe social networks training module, its email security training module, its password security training module, and its security outside of the office module, its PhishGuru™ training via simulated attack module). Relevant attributes, meta-data, user data, including historical training data, proficiency data and responses to mock attacks, may also include the type of data collected by Wombat Security Technologies Security Training Platform™.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

What is claimed is:

1. A computer-implemented method for training a user, comprising:
    by a sensor, sensing at least one action performed by the user and data corresponding to the at least one action to yield sensed data, wherein:
        the sensor comprises a USB sensor device and the sensing comprises detecting that a user of an electronic device has connected a USB device to the electronic device,
        the sensor comprises a Wi-Fi sensor device and the sensing comprises detecting that the user has connected the electronic device to a Wi-Fi access point,
        the sensor comprises a Bluetooth headset usage detection sensor and the sensing comprises identifying Bluetooth headset use,
        the sensor comprises a camera coupled with a computer vision program, or
        the sensor comprises a physical location tracking sensor and the sensing comprises detecting a location of the user;
    by a computer system comprising a processor, executing computer-readable programming instructions that cause the system to:
        access a data storage device that stores a training needs model that comprises an estimate of at least one of a cost and a benefit of exposing the user to at least one available training action,
        apply, to the training needs model, the sensed data to identify a cybersecurity threat scenario for which the user is at risk,
        access a collection of available training actions and select, based on the sensed data and the cybersecurity threat scenario, at least one training action from the collection of available training actions, and
        cause the selected at least one cybersecurity training action to be delivered to the user.

2. The method of claim 1, wherein the causing of the selected at least one cybersecurity training action includes delivering the cybersecurity training action to the electronic device.

3. The method of claim 1, wherein the causing of the selected at least one cybersecurity training action comprises recommending, using the computer system, that the user perform the at least one selected cybersecurity training action.

4. The method of claim 1, wherein the causing of the selected at least one cybersecurity training action comprises assigning, using the computer system, the selected at least one cybersecurity training action to the user.

5. The method of claim 4, further comprising providing, using the computer system, a date by which the user should be exposed to the selected at least one cybersecurity training action.

6. The method of claim 4, further comprising determining, using the computer system, a proficiency level that the user is to achieve.

7. The method of claim 1, wherein the available training actions include at least one of presenting an alert to the user, presenting a recommendation to the user, introducing the user to a best practice and strategy, presenting a cartoon to the user, presenting a quiz to the user, presenting video training content to the user, presenting audio training content to the user, presenting a game to the user, having the user take a simulation exercise, activating a training module that will incrementally present training content to the user over a period of time.

8. The method of claim 1, further comprising using the sensed at least one user action to customize the selected at least one cybersecurity training action delivered to the user.

9. The method of claim 1, further comprising customizing the delivery of the selected at least one cybersecurity training action based on the sensed at least one user action.

10. The method of claim 1, wherein causing the selected at least one cybersecurity training action to be delivered to the user comprises delivering the at least one selected cybersecurity training action to the user just-in-time to provide the user with relevant training as the user engages in an action for which the computer system has determined the user has an immediate need to be trained.

11. The method of claim 1, wherein causing the selected at least one cybersecurity training action to be delivered to the user comprises delivering the selected at least one cybersecurity training action to the user before the user engages in an action for which the computer system has determined the user has a need to be trained.

12. The method of claim 1, wherein identifying the threat scenario includes, using the computer system, accessing and using information about the user other than the sensed at least one user action.

13. The method of claim 12, wherein applying the sensed data to the training needs model includes at least one of accessing and using the role of the user in an organization, accessing the age of the user, accessing and using the education level of the user, accessing and using the prior training history of the user, accessing and using demographic data about the user, accessing and using information about the languages understood by the user, accessing and using information about possible visual impairments of the user, accessing and using information about relevant user preferences, and accessing and using information devices available to the user.

14. The method of claim 1, wherein selecting the at least one cybersecurity training action further comprises, using the computer system, accessing and using information about the user other than the sensed at least one action.

15. The method of claim 14, wherein applying the sensed data to the training needs model includes at least one of accessing and using the role of the user in an organization, accessing the age of the user, accessing and using the education level of the user, accessing and using the prior training history of the user, accessing and using demographic data about the user, accessing and using information about the languages understood by the user, accessing and using information about possible visual impairments of the user, accessing and using information about relevant user preferences, and accessing and using information devices available to the user.

16. The method of claim 1, further comprising customizing the selected at least one cybersecurity training action by, using the computer system, accessing and using information about the user other than the sensed at least one action.

17. The method of claim 16, wherein applying the sensed data to the training needs model includes at least one of accessing and using the role of the user in an organization, accessing the age of the user, accessing and using the education level of the user, accessing and using the prior training history of the user, accessing and using demographic data about the user, accessing and using information about the languages understood by the user, accessing and using information about possible visual impairments of the user, accessing and using information about relevant user preferences, and accessing and using information devices available to the user.

18. The method of claim 1, further comprising customizing a mode of delivery of the selected at least one cybersecurity training action by, using the computer system, accessing and using information about the user other than the sensed at least one action.

19. The method of claim 18, wherein applying the sensed data to the training needs model includes at least one of accessing and using the role of the user in an organization, accessing the age of the user, accessing and using the education level of the user, accessing and using the prior training history of the user, accessing and using demographic data about the user, accessing and using information about the languages understood by a user, accessing and using information about possible visual impairments of the user, accessing and using information about relevant user preferences, and accessing and using information devices available to a user.

20. The method of claim 1, wherein the sensing of at least one action performed by the user includes sensing a user action in response to a mock situation.

21. The method of claim 20, further comprising presenting the mock situation so that the mock situation comprises making at least one USB device with mock malware available to the user.

22. The method of claim 1, wherein the training needs model includes an objective function that reflects significant costs and benefits associated with exposing a user to different combinations of training actions in a given context and wherein the selection of the at least one cybersecurity training action is performed by attempting to minimize a susceptibility of the user associated with the cybersecurity threat scenario.

23. The method of claim 1, wherein the training needs model comprises a risk model comprising a susceptibility estimate of a user falling victim to one or more threat scenario or a cost estimate associated with one or more threat scenarios.

24. The method of claim 23, wherein the risk model is quantitative.

25. The method of claim 23, wherein the risk model is qualitative.

26. The method of claim 23, wherein the risk model combines both qualitative and quantitative elements.

27. The method of claim 23, wherein the risk model comprises a model based on estimates associated with one or more time horizons or a model based on estimates associated with a prior training the user may have received.

28. The method of claim 1, wherein the training needs model takes into account estimates of a reduction in risk resulting from the user taking an available training action.

29. The method of claim 28, wherein the training needs model is quantitative.

30. The method of claim 28, wherein the training needs model is qualitative.

31. The method of claim 1, wherein the training needs model takes into account the reduction in risk resulting from the user taking combinations of available training actions.

32. The method of claim 31, wherein the training needs model is quantitative.

33. The method of claim 31, wherein the training needs model is qualitative.

34. The method of claim 1, wherein the selected at least one cybersecurity training action includes a combination of at least one mandatory training action and at least one recommended training action.

35. The method of claim 1, wherein:
selecting the at least one cybersecurity training action comprises selecting a plurality of cybersecurity training actions; and
the programming instructions also cause the system to prioritize the selected plurality of cybersecurity training actions.

36. The method of claim 1, wherein the training needs model estimate takes into account at least one resource constraint.

37. The method of claim 36, wherein the at least one resource constraint includes at least one of time available to the user, or a level of complexity of the at least one training action.

38. The method of claim 1, wherein the selecting of at least one cybersecurity training action from the collection of available training actions takes into account meta-data about available training actions.

39. The method of claim 1 further comprising deriving the training needs model estimate, at least in part, using at least one of data mining, a statistical data analysis technique, or a combination thereof.

40. The method of claim 1, further comprising deriving the training needs model estimate, at least in part, using statistical data analysis techniques used to derive models that predict one or more parameters, the one or more parameters including the effectiveness of available training actions in addressing different training needs in different contexts, the effectiveness of combinations of training actions in addressing different training needs in the different contexts, the costs associated with exposing the user to a training action, the cost associated with exposing the user to a combination of training actions, the expected benefits of exposing the user to a given training action in a given context, and the expected benefits of exposing the user to combinations of training actions in a given context.

41. The method of claim 1, further comprising recording the sensed data at least in part on a data storage device.

42. The method of claim 1, wherein the training needs model further estimates at least one of a cost and a benefit of exposing the user to at least one cybersecurity training action in the collection of available training actions.

43. The method of claim 1, wherein the selected cybersecurity training action comprises at least one of safely using a computing device outside the office, safely using a USB-enabled device, learning safe password management practices, learning safe smart phone security practices, learning safe practices relating to protecting sensitive information, learning safe practices for carrying sensitive data out of a workplace, and learning safe practices relating to access to social networking sites.

44. The method of claim 1, wherein the sensed data comprises data for a plurality of different activities by the user, and applying the sensed data to the training needs model to identify the threat scenario comprises:
applying the data for the plurality of different activities to the training needs model to identify a pattern indicative of susceptibility to a threat; and
estimating a risk associated with the threat.

45. The method of claim 1, wherein the computer system includes a plurality of components, the plurality of components residing in a plurality of locations.

46. The method of claim 1, wherein the training needs model further estimates at least one of a cost and a benefit of exposing the user to at least one training action related to learning work-related skills.

47. The method of claim 1, wherein the sensing of at least one action performed by the user includes sensing failure of the user to perform at least one action.

48. The method of claim 1, wherein accessing the collection of available training actions and selecting, based on the sensed data, at least one cybersecurity training action also comprises:
accessing historical training data for the user, wherein the historical training data comprises training modules to which the user has already been exposed, and data corresponding to the user's response to the training modules to which the user has already been exposed; and
using the historical training data for the user to select the at least one cybersecurity training action.

49. A computer-implemented training system, comprising:
a sensor configured to monitor at least one action performed by the user, wherein:
the sensor comprises a USB sensor device and the action comprises that a user of an electronic device has connected a USB device to the electronic device,
the sensor comprises a Wi-Fi sensor device and the action comprises that the user has connected the electronic device to a Wi-Fi access point,
the sensor comprises a Bluetooth headset usage detection sensor and the sensing comprises identifying Bluetooth headset use,
the sensor comprises a camera coupled with a computer vision program, or
the sensor comprises a physical location tracking sensor and the sensing comprises detecting a location of the user;
the electronic device; and
a computer system that includes at least one processor, the computer system containing instructions which, when executed by the at least one processor, causes the computer system to:
receive data from the sensor, the data pertaining to the performance by the user of at least one of the actions;
apply the data to a training needs model to identify a cybersecurity threat scenario to which the user is at risk and estimate at least one of a cost and a benefit of exposing the user to at least one cybersecurity training action trained;
access a collection of training actions and select one or more cybersecurity training actions from the collection that are relevant to the cybersecurity threat scenario and the sensed data; and
provide the selected one or more cybersecurity training actions to the user through the electronic device.

50. The system of claim 49 wherein the monitoring of at least one action performed by the user includes monitoring the non-performance of the at least one action by the user.

51. The system of claim 49, wherein the monitoring of at least one action performed by the user includes collecting information from a plurality of other sensors.

52. The system of claim 49, wherein the computer system is coupled to at least one other source of information and receives other data from the at least one other source of information, the analysis using the training needs model further including analysis of the other data.

53. The system of claim 49, further comprising a data storage system that stores other data historically received from the sensor, and the instructions to apply the sensed data to the training needs model further also comprise instructions to apply the other data to the training needs model.

54. The system of claim 49, wherein at least part of the training needs model is stored in at least one data storage system from which the training needs model is accessed by the computer system to analyze the data.

55. The system of claim 49, further including at least one administrative console coupled to the computer system to enable at least one system administrator to access and customize elements of the training needs model.

56. The system of claim 49, further including at least one administrative console for at least one administrator to perform at least one of accessing, reviewing and manipulating the results of the analysis performed using the training needs model.

57. The system of claim 49, further including at least one administrator console for at least one administrator to perform at least one of reviewing the results of analysis conducted using the training needs model, modifying the results of the analysis conducted using the training needs model, reviewing the selected one or more training actions, modifying the selected one or more training actions, and modifying parameters associated with the providing of the selected one or more training actions to the user.

58. The system of claim 49, further comprising an external computer system coupled to the computer system to provide remote updates to the training needs model.

59. The system of claim 49, further comprising a data storage system to collect historical training data, the data storage system coupled to the computer system, enabling the computer system to access the historical training data to support the analysis of the data using the training needs model.

60. The system of claim 49, further comprising a data storage system to store at least part of the collection of training actions, the data storage system coupled to the computer system to enable the providing of the selected one or more cybersecurity training actions to the output device.

61. The system of claim 49, further comprising a data storage system to store meta-data about the available training actions, the data storage system coupled to the computer system, enabling the computer system to access the meta-data to support its analysis of the data using the training needs model.

62. The system of claim 49, further comprising a plurality of output devices, and wherein meta-data about the output devices available to provide the selected one or more cybersecurity training actions to the user is used by the computer system to select at least one of the plurality of output devices to provide the selected one or more cybersecurity training actions to the user.

63. The system of claim 62, further comprising a computer console coupled to the computer system, enabling at least one administrator to perform at least one of reviewing the at least one selected output device, and modify the at least one selected output device to provide the selected one or more cybersecurity training actions.

64. The system of claim 62, wherein the meta-data about the available output devices to provide the selected one or more cybersecurity training actions is maintained in at least one storage device coupled to the computer system to support the selection of at least one appropriate output device to provide the selected one or more cybersecurity training actions.

65. The system of claim 49, wherein the system further comprises instructions for presenting a mock situation to the user so that the mock situation comprises making at least one USB device with mock malware available to the user.

66. The system of claim 49, wherein:
the sensor comprises a USB data storage device sensor; and
the sensed action comprises detection that a USB drive has been connected to a user computing device.

67. The system of claim 49, wherein the instructions to access the collection of available training actions and select at least one cybersecurity training action also comprise instructions to:
access historical training data for the user, wherein the historical training data comprises training modules to which the user has already been exposed, and data corresponding to the user's response to the training modules to which the user has already been exposed; and
use the historical training data for the user to select the at least one cybersecurity training action.

68. The system of claim 49, wherein:
the sensor is a component of a user computing device; and
the computer system comprises a remote analysis host computer.

69. The system of claim 49, wherein:
the sensor comprises a Wi-Fi roaming sensor; and
the received data pertaining to the performance by the user of an action comprises information that the user has connected the electronic device to a Wi-Fi network.

70. The system of claim 49, wherein:
the sensor comprises a locator sensor; and
the received data pertaining to the performance by the user of an action comprises a global positioning system (GPS) location of the electronic device of the user.

* * * * *